US005190265A

United States Patent [19]

Barry et al.

[11] Patent Number: 5,190,265

[45] Date of Patent: Mar. 2, 1993

[54] VEHICLE SERVICE TOOL

[75] Inventors: Gerald E. Barry, Owatonna; Larry W. Betcher, Northfield; C. P. Emerson, Lamoni, all of Minn.

[73] Assignee: OTC Division of SPX Corporation, Owatonna, Minn.

[21] Appl. No.: 822,923

[22] Filed: Jan. 21, 1992

[51] Int. Cl.[5] .................. B60P 1/04

[52] U.S. Cl. .................. 254/8 B; 254/134; 254/DIG. 16; 269/17

[58] Field of Search .................. 254/133 R:134, DIG. 16, 254/8 B, 8 R, 124; 269/17

[56] References Cited

U.S. PATENT DOCUMENTS

| | | | |
|---|---|---|---|
| 2,747,837 | 5/1956 | Turner | 254/DIG. 16 |
| 2,748,459 | 6/1956 | Orr | 254/134 |
| 2,802,635 | 8/1957 | Engelbart | 254/134 |
| 2,976,033 | 3/1961 | Martin | 269/17 |
| 3,109,626 | 11/1963 | Arnes et al. | 254/134 |
| 3,136,526 | 6/1964 | Wolf | 254/134 |
| 3,218,056 | 11/1965 | Kaplan et al. | 269/17 |
| 3,381,953 | 5/1968 | Miller | 269/17 |
| 3,948,484 | 4/1976 | Tesinsky | 254/134 |
| 4,479,632 | 10/1984 | McIntire et al. | 254/8 B |
| 4,684,310 | 8/1987 | Stange | 254/134 |
| 4,691,904 | 9/1987 | Armstrong | 269/17 |
| 5,033,717 | 7/1991 | Symon . | |

OTHER PUBLICATIONS

Schlitt Engineering brochure.
Great Western Enterprises brochure.

*Primary Examiner*—Robert C. Watson
*Attorney, Agent, or Firm*—Wood, Phillips, VanSanten, Hoffman & Ertel

[57] ABSTRACT

A service tool is provided for removal and replacement of vehicle parts. The service tool comprises a base, a lift arm mechanism including a base end in a distal end, the base end being pivotally mounted to the base. A jack is mounted to the base and the lift arm mechanism for pivotally moving the lift arm mechanism to adjust height of the distal end. A vehicle part adaptor is included for receiving a vehicle part to be removed or replaced. A ball and socket joint mounts the vehicle part adaptor to the lift arm mechanism distal end for allowing rotary motion of the vehicle part adaptor relative to the distal end in every direction and adjustable screws adjustably limit movement of the vehicle part adaptor to control attitude of the same.

21 Claims, 3 Drawing Sheets

FIG. 2
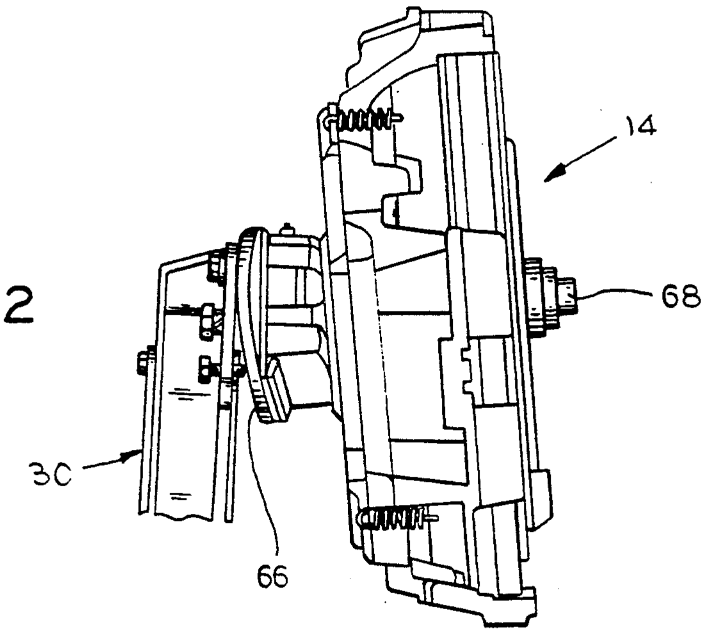
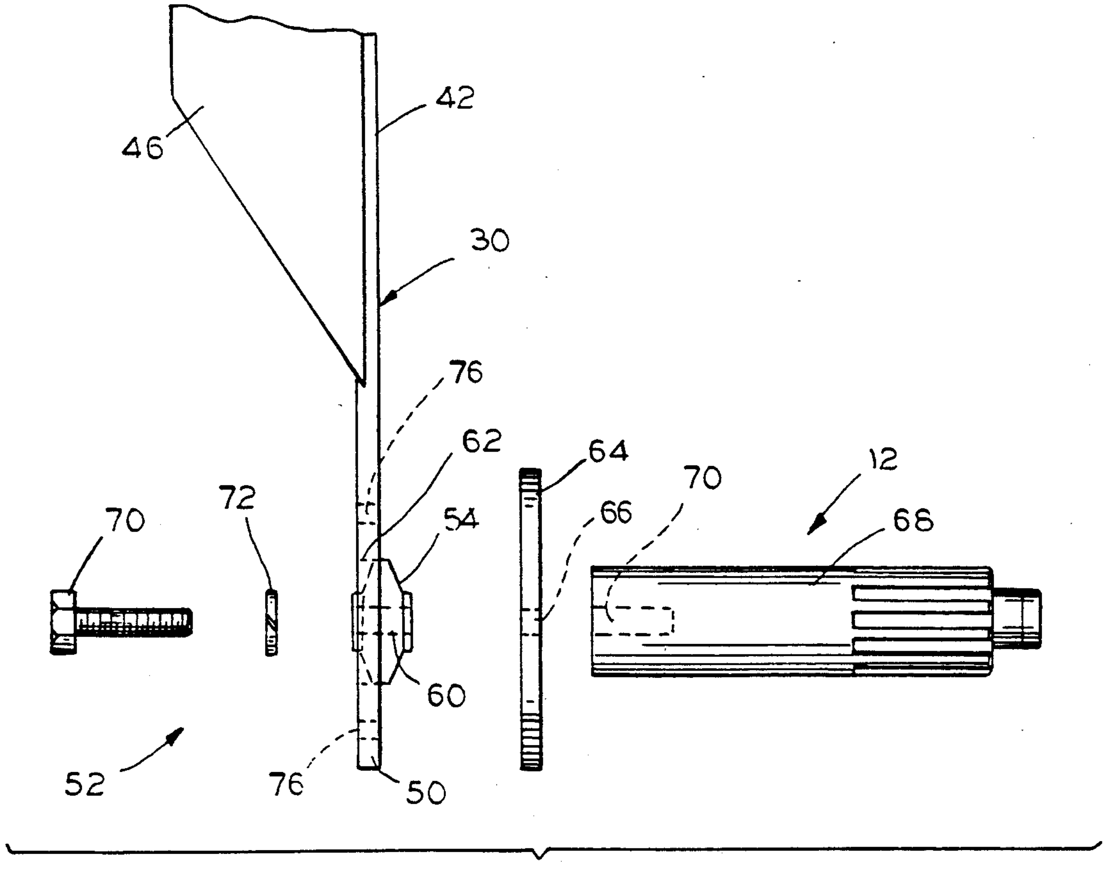
FIG. 4

VEHICLE SERVICE TOOL

FIELD OF THE INVENTION

This invention relates to a service tool for removal and replacement of vehicle parts, and, more particularly, to a service tool for removing a vehicle clutch or flywheel.

BACKGROUND OF THE INVENTION

Traditionally, a mechanic removes and installs a clutch assembly or flywheel by manually raising and lowering the components up to a distance of three feet from the floor to the clutch housing while kneeling or lying beneath the vehicle. Adding to the difficulty, the clutch or flywheel must be properly aligned with mating components and bolt holes securing the components in place. Moreover, the parts include sharp edges which must be grasped while performing the installation or removal tasks, occasionally resulting in injuries. Particularly, injuries can result from either dropping the part or merely handling the sharp edges.

The present invention is directed to solving one or more of the above problems.

SUMMARY OF THE INVENTION

In accordance with the invention, there is disclosed a service tool which raises and lowers heavy vehicle parts mechanically with the aid of an integrally mounted hydraulic jack. The clutch or flywheel is easily affixed to the device, rolled beneath the vehicle and raised and held in place or lowered as needed. This eliminates the manual requirements of handling the heavy components.

Broadly, there is disclosed herein a service tool for removal and replacement of vehicle parts. The service tool comprises a base, a lift arm mechanism including a base end in a distal end, and means for pivotally mounting the base end to the base. A jack is mounted to the base and the lift arm mechanism for pivotally moving the lift arm mechanism to adjust height of the distal end. A vehicle part adaptor is included for receiving a vehicle part to be removed or replaced. Mounting means mount the vehicle part adaptor to the lift arm mechanism distal end, comprising joint means for allowing rotary motion of the vehicle part adaptor relative to the distal end in every direction and attitude adjustment means for adjustably limiting movement of the vehicle part adaptor to control attitude of the same.

It is a feature of the invention that the lift arm mechanism comprises a lower four bar linkage mechanism including the base end and an upper end, and an upper lift arm having a near end and the distal end, the near end being pivotally connected to the linkage mechanism upper end.

It is another feature of the invention that the jack is mounted to the base and the lower four bar linkage mechanism.

It is yet another feature of the invention that the lift arm mechanism distal end comprises a generally vertical plate.

It is a further feature of the invention that the joint means comprises a ball and socket joint having a socket fixedly mounted to the vertical plate and a ball received in the socket for rotary motion in every direction.

It is still another feature of the invention that the mounting means further comprise means for fixedly securing the ball to the vehicle part adaptor.

It is still a further feature of the invention that the attitude adjustment means comprises an adjusting screw threadably secured to the vertical plate for abutting engagement with the vehicle part adaptor.

It is still another feature of the invention that the vehicle part adaptor comprises a splined shaft.

It is still an additional feature of the invention that the vehicle part adaptor comprises an elongate bar having openings at opposite ends for attachment to a flywheel.

It is still yet another feature of the invention that the vehicle part adaptor comprises a plate.

Further features and advantages of the invention will be readily apparent from the specification and from the drawings.

BRIEF DESCRIPTION OF THE DRAWINGS

FIG. 2 is a partial perspective view showing the tool of FIG. 1 with a clutch mounted thereon;

FIG. 4 is an exploded view similar to that of FIG. 3;

DETAILED DESCRIPTION OF THE INVENTION

Figure 1:
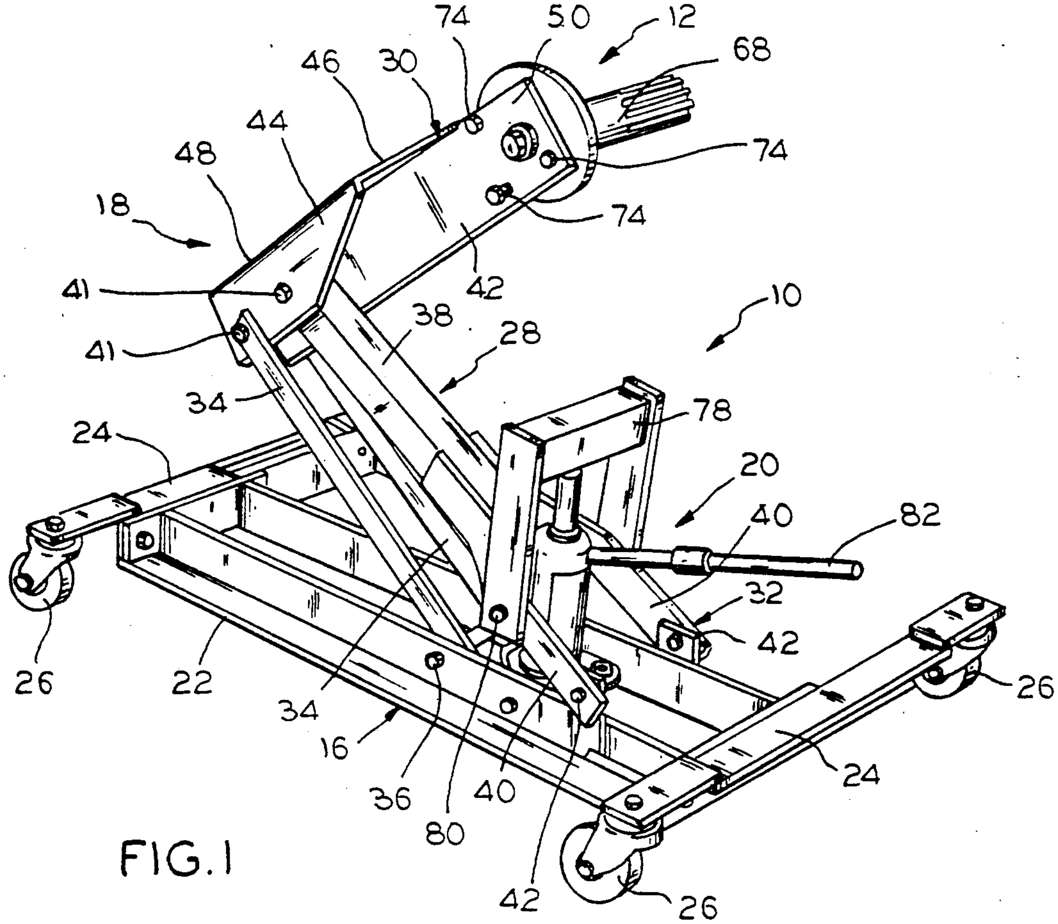
FIG. 1 is a perspective view of a service tool according to the invention including a vehicle part adaptor for removing a clutch.

With reference to the drawings and particularly FIG. 1, a service tool 10 is illustrated for removal and replacement of vehicle parts. Particularly, in the embodiment of FIG. 1, the service tool 10 includes a vehicle part adaptor 12 adapted for removal and replacement of vehicle parts, such as a clutch 14, see FIG. 2.

The service tool 10 comprises a wheeled base 16 and a lift arm mechanism 18 pivotally mounted to the base 16. A jack 20 is mounted to the base 16 and lift arm mechanism 18 for pivotally moving the lift arm mechanism 18 to adjust height of the vehicle part adapter 12 mounted thereto.

The base 16 comprises a cross frame 22 connected at opposite ends by legs 24. A caster 26 is provided at the opposite end of each leg 24 for providing portability of the service tool 10.

The lift arm mechanism 18 utilizes a four bar linkage mechanism 28 including an upper lift arm 30. The four bar linkage mechanism 28 includes a base end 32 pivotally mounted to the base cross frame 22. Particularly, the four bar linkage mechanism 28 includes a pair of straps 34 pivotally connected to the cross frame 22 as at 36 and a lower lift arm 38 having lower legs 40 pivotally connected to the frame as at 42. Opposite ends of the straps 34 and lower lift arm 38 are pivotally connected to the upper lift arm 30 as at 41.

The upper lift arm 30 comprises an elongate vertical plate 42 and an opposite relatively shorter vertical plate 44 connected by a gusset 46. The upper lift arm 30 is pivotally connected at the four bar linkage mechanism 28 at a near end 48. A distal end 50 is used for connecting to the vehicle part adaptor 12.

Figure 3:
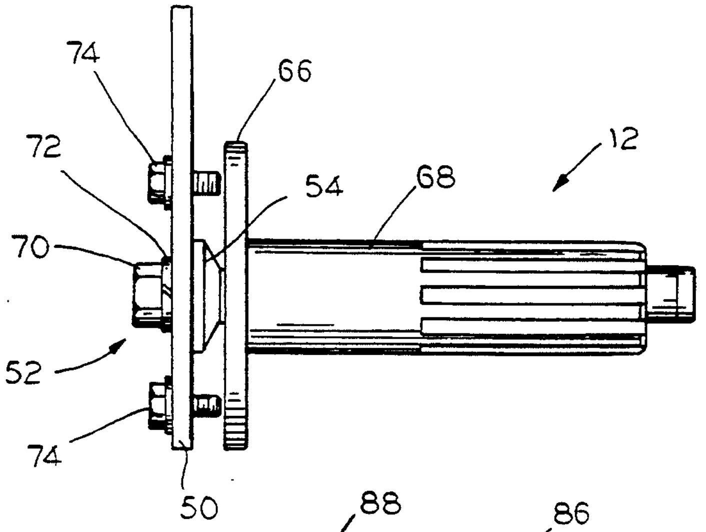
FIG. 3 is a detailed view showing means for mounting the vehicle part adaptor to the service tool of FIG. 1 in greater detail.
Figure 5:
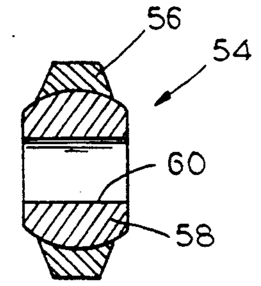
FIG. 5 is a sectional view of a ball and socket used for mounting the vehicle part adaptor to the service tool.

A mounting assembly 52, see also FIGS. 3 and 4, is provided for mounting the vehicle part adaptor 12 to the lift arm distal end 50. The mounting assembly 52 includes a ball and socket joint 54, see FIG. 5, comprising a hex shaped socket 56 having a partial spherical ball 58 wedged therein. The spherical ball 58 includes a through opening 60. The socket 56 is secured to the upper lift arm distal end 50 in a through opening 62, see FIG. 4, as by welding.

In the first illustrated embodiment, the vehicle part adaptor comprises a circular plate 64 having a central aperture 66 and a splined shaft 68 having a threaded counter bore 70 at one axial end. To mount the vehicle part adaptor 12 to the upper link arm 30, a cap screw 70 is inserted through a washer 72 and the socket through opening 60 and subsequently the plate through opening 66 and threaded into the shaft counter bore 70, see FIGS. 3 and 4. The use of the ball and socket joint 54 provides rotary motion of the vehicle part adaptor 12 relative to the lift arm distal end 50 in every direction.

To control attitude of the vehicle part adaptor 12, three cap screws 74 are threadably received in threaded openings 76 in the upper lift arm distal end 50 in a triangular configuration, as illustrated in FIG. 1. Each of the cap screws 74 abuts the plate 66, as illustrated in FIG. 3. Specifically, the attitude of the vehicle part adaptor 12 is controlled by turning one or more of the screws 74. The relative spacing between the plate 66 and distal end 50 at each screw location limits rotary movement of the vehicle part adaptor 12 about the ball and socket joint 54. As will be appreciated, the weight of the vehicle part adaptor itself and any vehicle part thereon will cause the same to tend to rotate directly downwardly against the screws 74.

The jack 20 is mounted to the base cross frame 22 and a jack yoke 78 which is pivotally mounted to the lower lift arm legs 40 as at 80. The jack 20 includes a jack handle 82 which is operated to selectively raise or lower the jack resulting in height adjustment of the upper lift arm distal end 50, and thus vehicle part adaptor 12.

In use, the service tool is positioned adjacent a vehicle and a suitable lubricant is placed on the splined shaft 68. The adjusting screws 74 are adjusted so that the angle of the input shaft 68 matches the angle of the vehicle clutch assembly.

The service tool is then positioned under the vehicle and the jack 20 is operated to raise the upper lift arm 30 to the correct height. The service tool is then repositioned to insert the splined shaft 68 into the clutch assembly. If necessary, further alignment of the shaft 68 can be made by turning the adjusting screws 74 as necessary. The mounting bolts on a clutch pressure plate can then be removed and subsequently, the service tool moved away from the vehicle with the clutch 14 thereon, as illustrated in FIG. 2. The pressure on the jack 20 can then be released to lower the clutch assembly to the floor.

Installation of the clutch assembly into the vehicle is generally opposite that discussed above and will not be discussed in detail herein.

Figure 6:
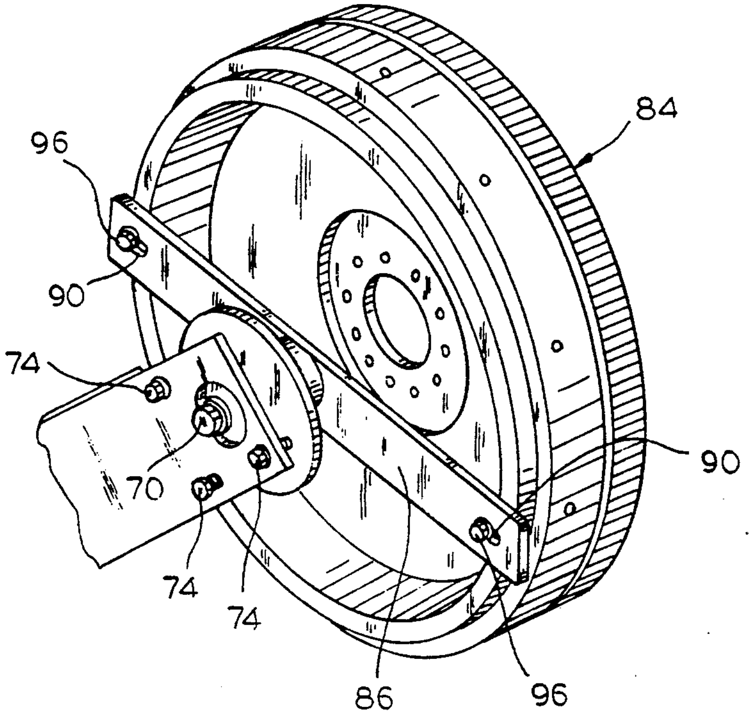
FIG. 6 is a partial perspective view illustrating an upper end of the service tool of FIG. 1 with a flywheel attachment securing a flywheel thereto.
Figure 7:
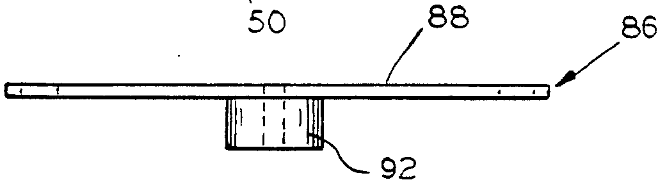
FIG. 7 is a plan view of the flywheel handler of FIG. 6.
Figure 8:
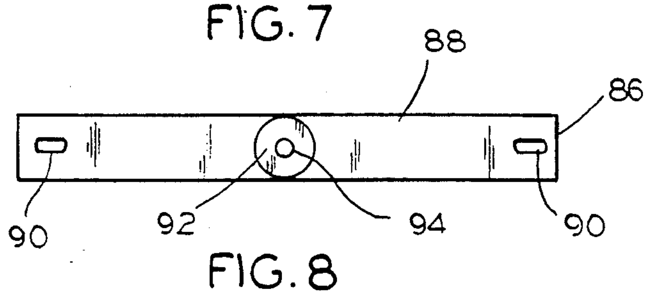
FIG. 8 is an elevation view of the flywheel handler of FIG. 6.
Figure 9:
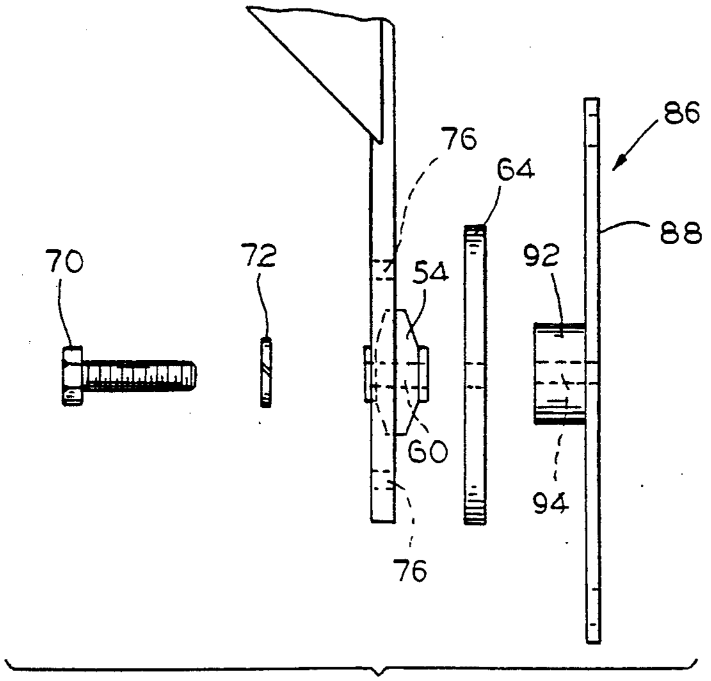
FIG. 9 is an exploded view illustrating securement of the flywheel handler to the service tool.

The service tool 10 can also be used to remove a flywheel 84, see FIG. 6, from the vehicle. For this, a flywheel attachment 86, see FIGS. 7 and 8, is used. The flywheel attachment 86 includes an elongate plate or bar 88 having slotted apertures 90 at opposite ends and a cylindrical spacer 92 having a threaded counterbore 94 welded to the bar 88 at a central location thereof. To install the flywheel handler 86 on the service tool 10, the splined shaft 68 is removed by loosening the mounting screw 70. With the splined shaft 68 removed, the screw 70 is then threaded into the threaded counterbore 94, see FIG. 9.

Thereafter, to remove the flywheel, the service tool 10 is operated as discussed above, except that a pair of screws 96, see FIG. 6, are inserted through the bar slots 90 to secure the flywheel handler 86 to the flywheel 84 in suitable threaded openings provided therein. Again, the adjusting screws 74 can be used to control attitude or angle of the flywheel handler 86 for proper alignment.

By using the ball and socket joint 54, a universally operable joint is available which permits free movement in any direction for ease of alignment. Alignment can be affected by using any type of wrench, such as a socket wrench, for adjusting the adjusting screws 74.

The service tool 10 permits the easy replacement of clutch assemblies weighing as much as 150 pounds and provides a lifting range of nine $\frac{1}{4}$ inches to thirty-seven $\frac{1}{8}$ inches. The swivel casters 26 provide easy maneuverability.

The illustrated embodiment of the invention is intended to illustrate the broad concepts comprehended by the invention.

I claim:

1. A service tool for removal and replacement of vehicle parts, comprising:

- a base;
- a lift arm mechanism including a base end and a distal end, and means for pivotally mounting the base end to the base;
- a jack mounted to the base and the lift arm mechanism for pivotally moving the lift arm mechanism base end to adjust height of the distal end;
- a vehicle part adapter for receiving a vehicle part to be removed or replaced; and
- mounting means for mounting the vehicle part adapter to the lift arm mechanism distal end, comprising joint means for allowing rotary motion of the vehicle part adapter relative to the distal end in every direction about a horizontal axis and attitude adjustment means for adjustably limiting movement of the vehicle part adapter to control attitude of the same.

2. The service tool of claim 1 wherein said lift arm mechanism comprises a lower four bar linkage mechanism including said base end and an upper end, and an upper lift arm having a near end and said distal end, the near end being pivotally connected to the linkage mechanism upper end.

3. The service tool of claim 2 wherein said jack is mounted to the base and the lower four bar linkage mechanism.

4. The service tool of claim 1 wherein said lift arm mechanism distal end comprises a generally vertical plate.

5. The service tool of claim 4 wherein said joint means comprises a ball and socket joint having a socket fixedly mounted to said vertical plate and a ball received in the socket for rotary motion in every direction.

6. The service tool of claim 5 wherein said mounting means further comprises means for fixedly securing said ball to said vehicle part adapter.

7. The service tool of claim 6 wherein said attitude adjustment means comprises an adjusting screw threadably secured to said vertical plate for abutting engagement with said vehicle part adapter.

8. The service tool of claim 1 wherein said vehicle part adapter comprises a splined shaft.

9. The service tool of claim 1 wherein said vehicle part adapter comprises an elongate bar having openings at opposite ends for attachment to a flywheel.

10. The service tool of claim 1 wherein said vehicle part adapter comprises a plate.

11. A portable service tool for removal and replacement of vehicle parts, comprising:

a wheeled base;

a lift arm mechanism including a base end and a distal end, and means for pivotally mounting the base end to the wheeled base;

a jack mounted to the base and the lift arm mechanism for pivotally moving the lift arm mechanism base end to adjust height of the distal end;

a vehicle part adapter for receiving a vehicle part to be removed or replaced; and mounting means for mounting the vehicle part adapter to the lift arm mechanism distal end, comprising a ball and socket joint for allowing rotary motion of the vehicle part adapter relative to the distal end in every direction about a horizontal axis and attitude adjustment means for adjustably limiting movement of the vehicle part adapter to control attitude of the same.

12. The service tool of claim 11 wherein said lift arm mechanism comprises a lower four bar linkage mechanism including said base end and an upper end, and an upper lift arm having a near end and said distal end, the near end being pivotally connected to the linkage mechanism upper end.

13. The service tool of claim 12 wherein said jack is mounted to the base and the lower four bar linkage mechanism.

14. The service tool of claim 11 wherein said lift arm mechanism distal end comprises a generally vertical plate.

15. The service tool of claim 14 wherein said ball and socket joint has a socket fixedly mounted to said vertical plate and a ball received in the socket for rotary motion in every direction.

16. The service tool of claim 15 wherein said mounting means further comprises means for fixedly securing said ball to said vehicle part adapter.

17. The service tool of claim 11 wherein said attitude adjustment means comprises an adjusting screw threadably secured to said lift arm mechanism distal end for abutting engagement with said vehicle part adapter.

18. The service tool of claim 11 wherein said vehicle part adapter comprises a splined shaft.

19. The service tool of claim 11 wherein said vehicle part adapter comprises an elongate bar having openings at opposite ends for attachment to a flywheel.

20. The service tool of claim 11 wherein said vehicle part adapter comprises a plate.

21. A service tool for removal and replacement of vehicle parts, comprising:

a base;

a lift arm mechanism including a base end and a distal end, and means for pivotally mounting the base end to the base;

a jack mounted to the base and the lift arm mechanism for pivotally moving the lift arm mechanism base end to adjust height of the distal end;

a vehicle part adapter for receiving a vehicle part to be removed or replaced; and mounting means for mounting the vehicle part adapter to the lift arm mechanism distal end, comprising joint means for allowing rotary motion of the vehicle part adapter relative to the distal end in every direction and attitude adjustment means for adjustably limiting movement of the vehicle part adapter to control attitude of the same, said attitude adjustment means comprising three screws threadably received in threaded openings in the lift arm mechanism distal end and angularly spaced about the joint means, each screw abutting the vehicle part adapter for controlling attitude of the same.

* * * * *